United States Patent [19]

Brandt

[11] Patent Number: 5,250,863
[45] Date of Patent: Oct. 5, 1993

[54] MOTOR AND COOLING MEANS THEREFOR

[75] Inventor: Bengt Å. Brandt, Sundbyberg, Sweden

[73] Assignee: ITT Flygt AB, Solna, Sweden

[21] Appl. No.: 927,770

[22] Filed: Aug. 10, 1992

[30] Foreign Application Priority Data

Sep. 3, 1991 [SE] Sweden .......................... 9102517

[51] Int. Cl.⁵ .......................... H02K 9/20; H02K 5/19
[52] U.S. Cl. .......................... 310/54; 310/87
[58] Field of Search .......................... 310/52, 53, 54, 57, 310/58, 59, 62, 63, 60 A, 64, 87, 88, 254

[56] References Cited

U.S. PATENT DOCUMENTS 2,648,789  8/1953  Geyer .......................... 310/54
4,198,191  4/1980  Pierce .......................... 310/54 X
4,742,257  5/1988  Carpenter .......................... 310/57 X Primary Examiner—Steven L. Stephan
Assistant Examiner—E. To
Attorney, Agent, or Firm—Menotti J. Lombardi

[57] ABSTRACT

The stator housing of an electric motor has its central, rotary axis offset from, and parallel with, the longitudinal axis of its enclosing casing. The housing and casing define a cooling liquid chamber therebetween which, due to the offset axes, define the chamber of different widths. A wall, of arcuate configuration is joined to the casing to render the chamber of uniform width thereabout and therealong, and to form a separate, lateral compartment for conduits for conducting cooling liquid into the chamber.

5 Claims, 5 Drawing Sheets

MOTOR AND COOLING MEANS THEREFOR

BACKGROUND OF THE INVENTION

This invention pertains to submersible, electric-motor driven liquid pumps, and to means for liquid-cooling of the electric motors thereof, and in particular to such a motor and cooling means therefor which offers greatly improved motor coolant circulation and cooling efficiency.

A common type of pump is the so-called submersible one in which the pump and the electric motor therefor comprise a unit which is submersed in the pumped liquid. Such a motor normally obtains its cooling directly from the surrounding, pumped liquid. If, however, the level of the liquid decreases, so that the motor is surrounded by air, the cooling of the motor way be insufficient. Consequently, it is known to provide an internal cooling system, for the motor, which uses the pumped liquid for the purpose. An example of such an internal cooling system is disclosed in the Swedish patent No. 367 465.

As the pumped liquid often contains pollutants, said patent teaches the use of a narrow slot, arranged between the impeller of the pump and the pump housing, through which comparatively clean liquid is conducted into the cooling water area between the pump and the motor. Ancillary vanes, formed atop the impeller, cause the cooling water to circulate. The aforesaid slot prevents solid pollutants from entering the aforesaid area and, consequently, diminishes the likelihood of a clogging of cooling channels about the motor.

Further, the cited patent discloses the use of vanes, within the cooling jacket which houses the motor, for directing the cooling liquid upwardly, along the motor, to effect cooling of the entire motor.

Because of the development towards larger and more powerful motors, the demand for good cooling of such has been increased. Yet, cooling therefor available by the known weans is not always adequate. Problems arise due to the fact that is is difficult for the cooling liquid to reach upper portions of the motor as solid pollutants accrete in the cooling-liquid passages. Additionally, motors are often operated at slow speeds and, consequently, they can not effect a sufficient cooling liquid circulation without large, energy-demanding ancillary vanes. To solve the problem and provide enhanced, cooling liquid circulation, it has been proposed to convey cooling liquid to the top of the motor in separate, outwardly-arranged conduits. By this arrangement, the cooling liquid will flow down, between the stator housing of the motor and the surrounding cooling jacket, The main disadvantage with this is that these external conduits are expensive and readily subject to damage during rough handling of the motor-pump.

An alternative solution, which has been tested, is to arrange the conduits for the cooling liquid within the motor housing. Then, to insure that the conduits will not disturb the circular flow about the motor stator housing, the latter is provided with longitudinal ridges or recesses in which the conduits are nested. Such ridges or recesses, however, disturb the symmetry and require that the stator housing have considerably thicker and stronger wall material to sustain the pressure loading thereof. Tests have established that a stator housing designed in this manner requires wall material three times thicker than that required by a fully circular stator housing, to be able to withstand a same, internal pressure.

SUMMARY OF THE INVENTION

It is an object of this invention to set forth a solution for the aforestated problem, which solution does not have the deficiences, noted in the foregoing prior art solutions.

Particularly, it is an object of this invention to set forth a motor and cooling means therefor, comprising a water-proof, electric motor; a stator housing, enclosing said motor, having a central, vertical axis; a casing, substantially enclosing said motor and housing therewithin, having a central, longitudinal axis; and means coupled to said motor for pumping liquid into said casing for cooling of said motor; wherein said axes are offset from, and parallel with, each other.

BRIEF DESCRIPTION OF THE DRAWINGS

Further objects of this invention, as well as the novel features thereof, will become apparent by reference to the following description, taken in conjunction with the accompanying figures, in which.

DESCRIPTION OF THE PREFERRED EMBODIMENT

Figure 1:
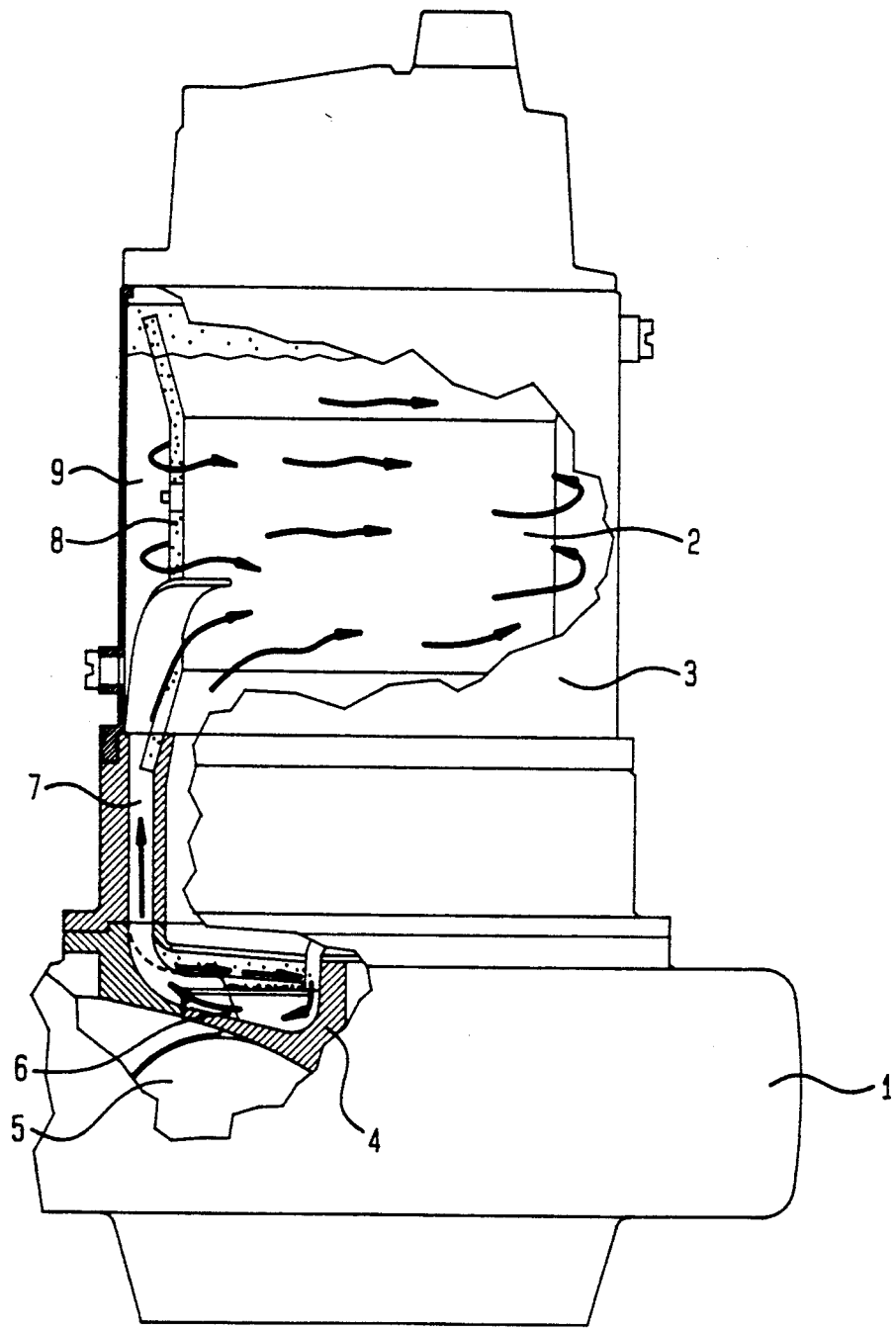
FIG. 1 is a vertical depiction, partly cut away, of a prior art motor-driven pump and cooling system therefor.
Figure 2:
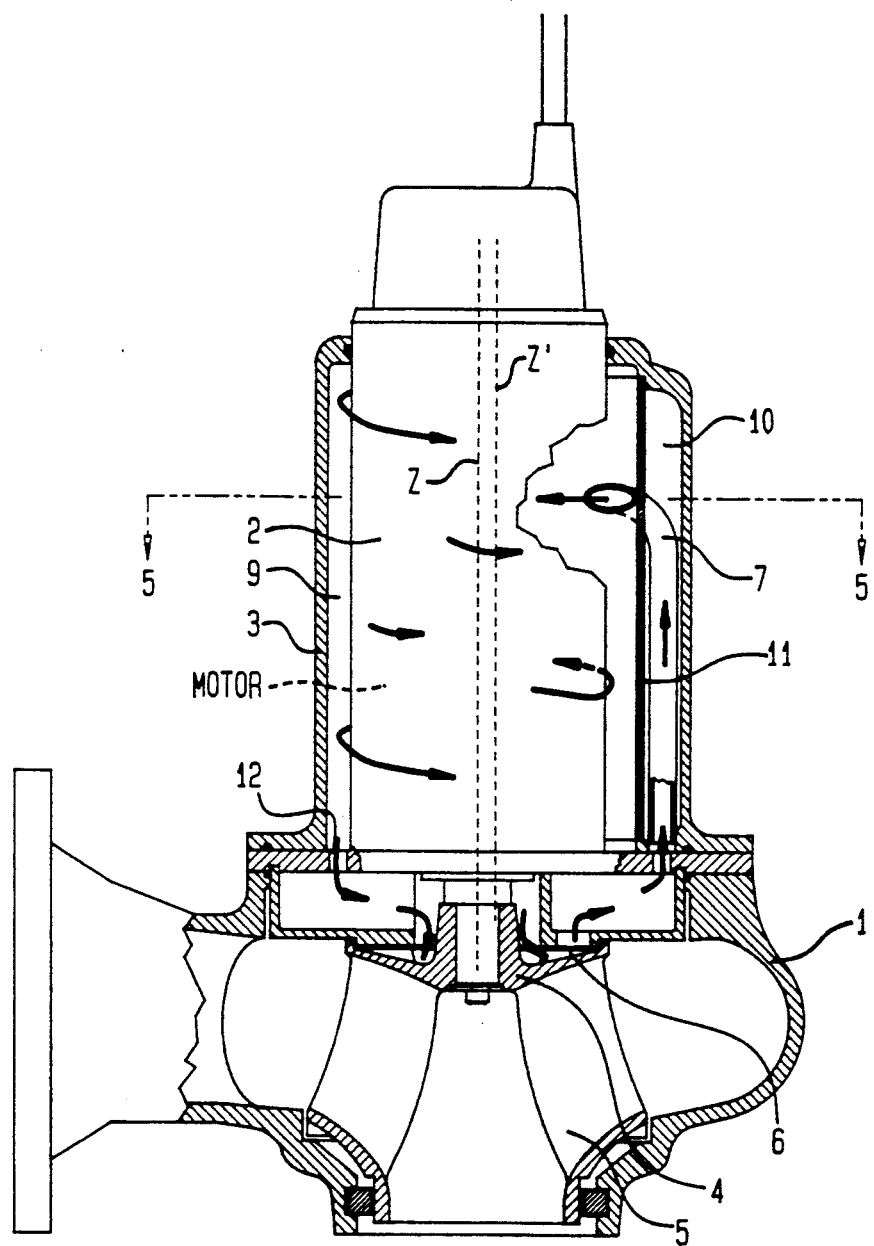
FIG. 2 is a cross-sectional view of the inventive motor and cooling means therefor, according to an embodiment thereof, taken along section 2—2 of FIG. 5.
Figure 3:
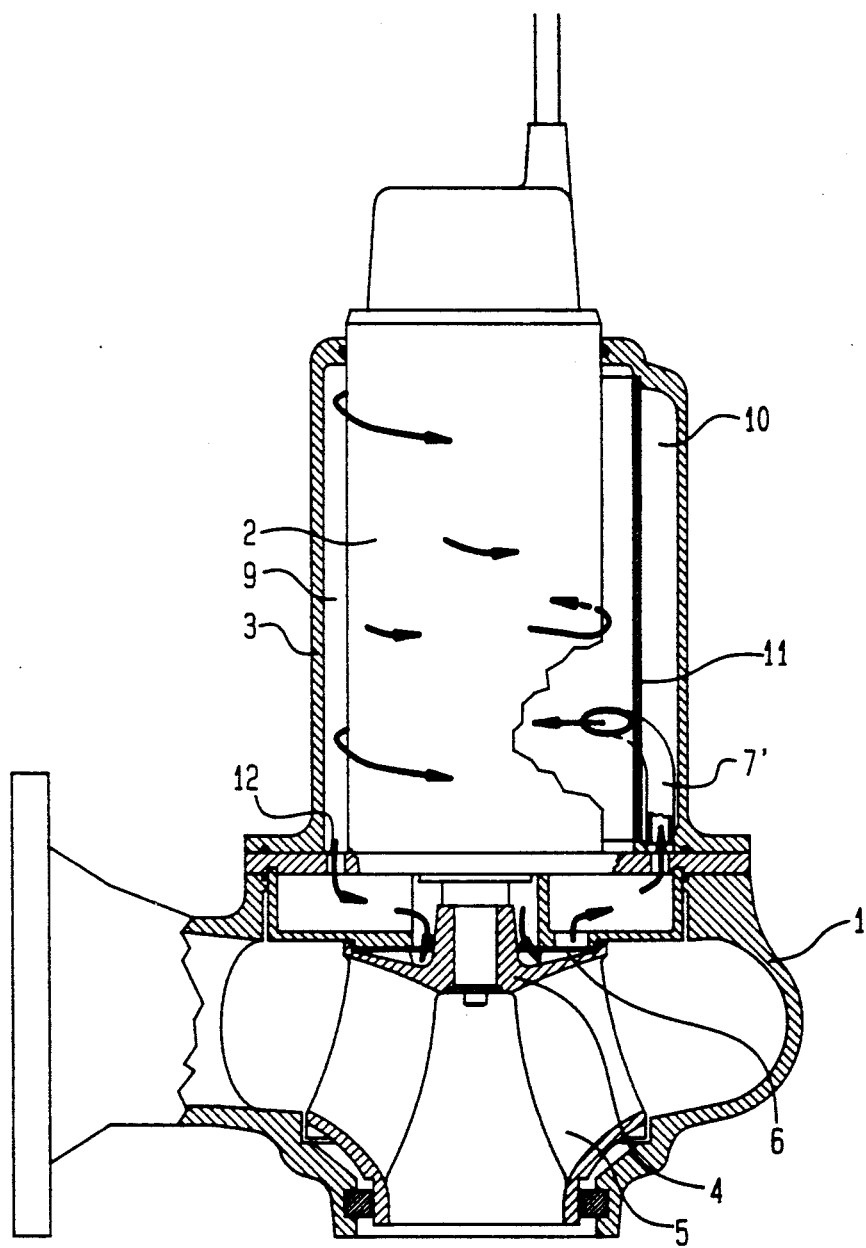
FIG. 3 is a cross-sectional view of the embodiment of FIG. 2, the same taken along section 3—3 of FIG. 5.
Figure 4:
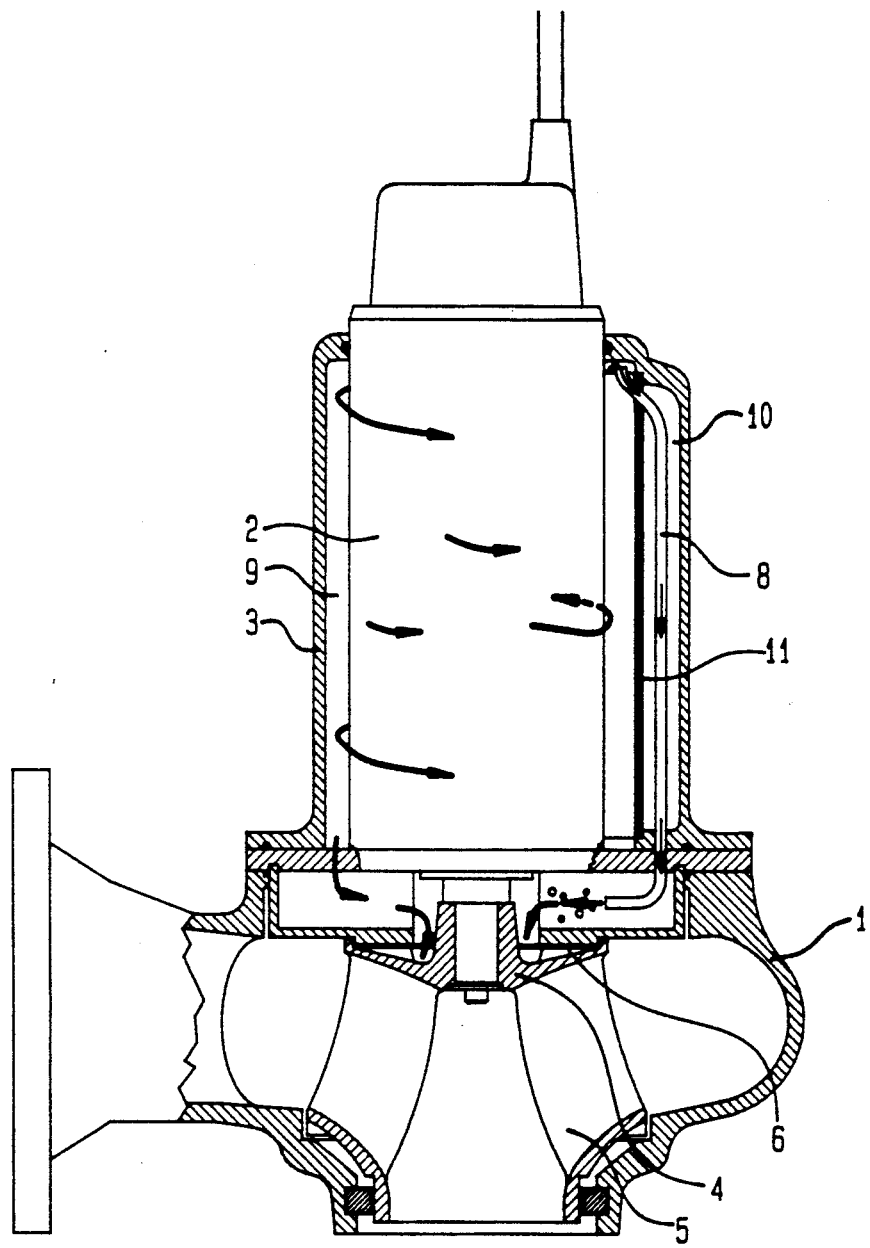
FIG. 4 is a cross-sectional view of the embodiment of FIGS. 2 and 3, the saw taken along section 4—4 of FIG. 5.
Figure 5:
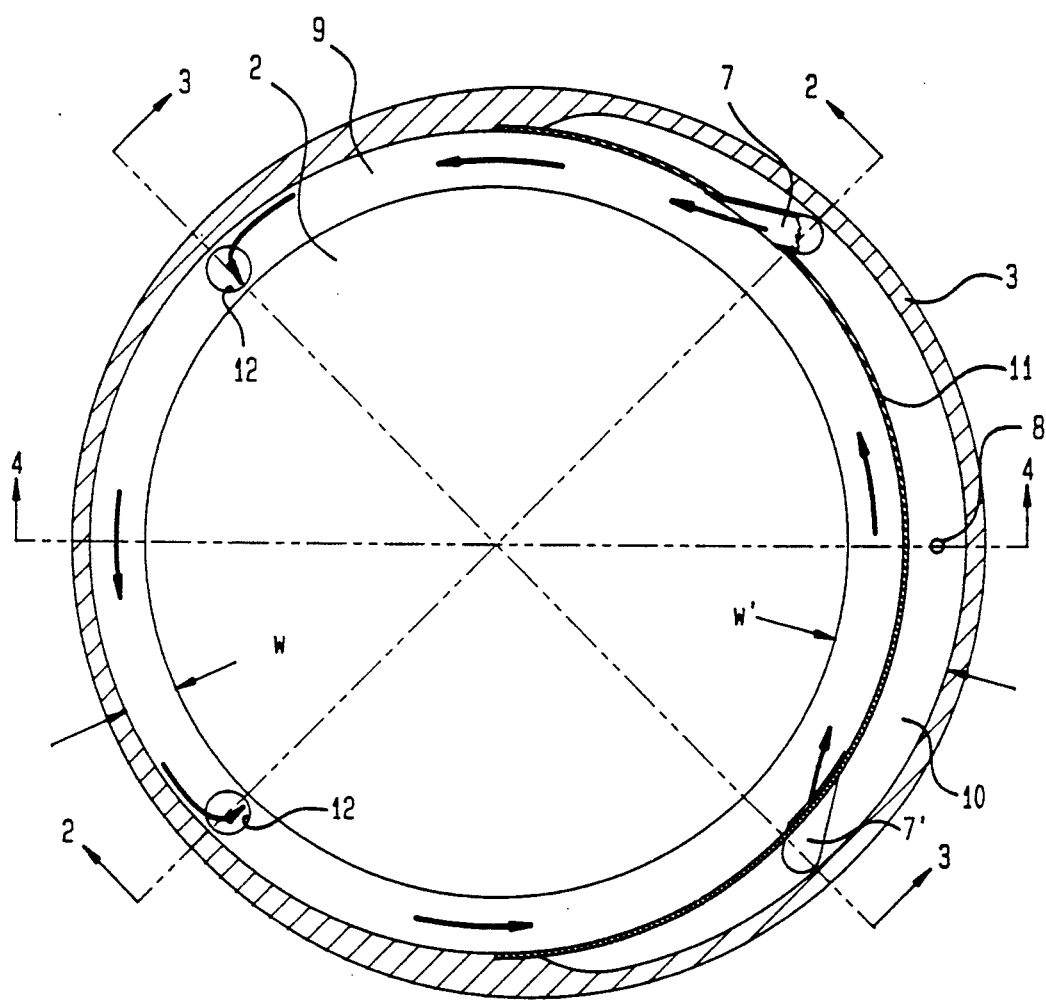
FIG. 5 is a cross-sectional view of the aforesaid embodiment of the invention, taken along section 5—5 of FIG. 2.

The motor-driven pump and cooling system therefor, shown in FIG. 1, comprises that which is practiced in the prior art. The pump housing 1 mounts thereupon a motor stator housing 2 and a casing 3. Housing 1 confines therewithin the impeller 4 of a centrifugal pump which has win vanes 5 and ancillary vanes 6, the latter formed atop the impeller 4. A conduit 7 conducts cooling liquid, pumped by vanes 6, into the casing 3 for cooling of the motor. An exhaust pipe 8 carries air bubbles upwardly in the casing 3. The uniform spacing between the casing 3 and the housing 2 defines a annular chamber 9 through which the cooling liquid circulates about the housing 2.

In order to obtain an effective cooling of the motor, it is important that the chamber 9 be unobstructed, as protruding components would hinder an optimum flow of the cooling liquid, and provide surfaces upon which solid pollutants could accumulate. The invention utilizes conduits for carrying the cooling liquid well into the chamber 9 without obstructing the chamber.

FIGS. 2 through 5 depict an embodiment of the invention in which there is provided a compartment in which to confine conduits, for cooling liquid flow, and air bubble discharge, albeit the casing 3 is fully circular. Herein, the motor axis "Z" is offset from, and parallel with, the longitudinal axis "Z'" of the casing 3. Accordingly, the annular chamber 9 has a given width "W" at one side thereof, and a greater width "W'" at the opposite side thereof. A sheet metal wall 11, of arcuate configuration, is coupled to the casing 3 to define, between the wall 11 and the casing 3, a separate compartment 10. The wall 11 conforms the width at the aforesaid opposite side of the chamber 9 to a uniformity with that of the aforesaid one side. Consequently, fluid flow therewithin will be uniform and steady. Now, the compartment 10 provides a space in which to confine cooling liquid conduits and conduits for expelling air bubbles. As shown, then, conduits 7 and 7', are set within the compartment 10. The saw are supplied cooling liquid from the ancillary vanes 6 of the impeller 4, and each has a termination which penetrates the wall 11 and opens into fluid communication with the chamber 9. A cooling liquid return port 12 is formed in the pump housing 1, in order that the liquid can return to the impeller 4. The conduit 8 conducts air bubbles, which collect in the upper portion of the casing 3, to the impeller 4.

According to the invention, the chamber 9 is wholly unobstructed, and as noted in the foregoing, of uniform width fully thereabout and therealong. The conduits 7 and 7' efficiently carry the cooling liquid into the chamber, and are confined within the separately defined compartment 10. The casing 3 remains fully circular, requiring no complicated, manufactured configuration.

While I have described my invention in connection with a specific embodiment thereof, it is to be clearly understood that this is done only by way of example and not as a limitation to the scope of the invention, as set forth in the objects thereof and in the appended claims.

I claim:

1. A motor and cooling means therefor, comprising:
   a water-proof electric motor;
   a stator housing enclosing said motor, said housing having a central, vertical axis;
   a casing, substantially enclosing said motor and housing therewithin, said casing having a central longitudinal axis which is offset and parallel to said vertical axis; and
   an arcuate wall segment joined to said casing and interposed between said housing and a portion of said casing;
   said housing, wall segment and casing cooperatively define a uniform annular chamber therebetween; and
   liquid pumping means for pumping liquid into said chamber.

2. A motor and cooling means therefor, according to claim 1, wherein:
   said wall segment and said casing portion cooperatively define a compartment therebetween; and
   said liquid pumping means includes liquid conducting means confined within said compartment for conducting cooling liquid through said compartment.

3. A motor and cooling means therefor, according to claim 2, wherein:
   said liquid conducting means comprises at least one conduit for introducing liquid into said chamber; and at least one conduit is included for discharging air bubbles from said chamber.

4. A motor and cooling means therefor, according to claim 3, wherein:
   said conduits have terminations which (a) are in penetration of said wall, and (b) open into fluid communication with said chamber.

5. A motor and cooling means therefor, according to claim 4, wherein:
   said annular chamber is unobstructed fully thereabout and lengthwise thereof.

* * * * *